United States Patent
Lee

(10) Patent No.: US 12,526,328 B2
(45) Date of Patent: *Jan. 13, 2026

(54) CONTROL OF MEETING ROOM DEVICES FOR VIDEO COMMUNICATIONS

(71) Applicant: Zoom Communications, Inc., San Jose, CA (US)

(72) Inventor: Cynthia Eshiuan Lee, Austin, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,629

(22) Filed: Oct. 31, 2023

(65) Prior Publication Data

US 2024/0064185 A1 Feb. 22, 2024

Related U.S. Application Data

(63) Continuation of application No. 17/246,537, filed on Apr. 30, 2021, now Pat. No. 11,843,647.

(51) Int. Cl.
*H04L 65/4038* (2022.01)
*H04L 65/401* (2022.01)
*H04L 65/403* (2022.01)

(52) U.S. Cl.
CPC ...... *H04L 65/4038* (2013.01); *H04L 65/4015* (2013.01); *H04L 65/403* (2013.01)

(58) Field of Classification Search
CPC ............ H04L 65/4038; H04L 65/4015; H04L 65/403; H04L 12/1845; H04L 12/1827
See application file for complete search history.

(56) References Cited

U.S. PATENT DOCUMENTS

| | | |
|---|---|---|
| 2012/0185291 A1 | 7/2012 | Ramaswamy et al. |
| 2015/0185993 A1 | 7/2015 | Wheatley et al. |
| 2017/0006162 A1 | 1/2017 | Bargetzi et al. |
| 2018/0124136 A1 | 5/2018 | Faulkner et al. |
| 2018/0199164 A1 | 7/2018 | Bargetzi et al. |
| 2018/0278890 A1 | 9/2018 | Krantz et al. |
| 2019/0149768 A1 | 5/2019 | Mcardle |
| 2021/0014237 A1* | 1/2021 | Fried ...................... H04L 63/08 |
| 2022/0020388 A1* | 1/2022 | Trim ..................... H04M 3/568 |

OTHER PUBLICATIONS

International Search Report and Written Opinion mailed on Jul. 18, 2022 in corresponding PCT Application No. PCT/US2022/025137.

* cited by examiner

*Primary Examiner* — Lesa M Kennedy
(74) *Attorney, Agent, or Firm* — Young Basile Hanlon & MacFarlane, P.C.

(57) ABSTRACT

Various embodiments of an apparatus, method(s), system(s) and computer program product(s) described herein are directed to pairing a computer device, via a client application running on the computer device, with a meeting room application of a communication platform. The meeting room application is associated with an identified physical meeting space that has a designated meeting controller device. The meeting controller device has one or more virtual meeting controls that generate control input. The client application running on the paired computer device receives a selection to launch a meeting controller application at the paired computer device. The launched controller application running at the paired computer device send control input for an instance of a virtual meeting presented by the meeting room application for the identified physical meeting space.

20 Claims, 12 Drawing Sheets

CONTROL OF MEETING ROOM DEVICES FOR VIDEO COMMUNICATIONS

CROSS-REFERENCE TO RELATED APPLICATION(S)

This application is a continuation of U.S. patent application Ser. No. 17/246,537, filed Apr. 30, 2021, the entire disclosure of which is hereby incorporated by reference.

FIELD OF INVENTION

Various embodiments relate generally to digital communication, and more particularly, to systems and methods providing for the control of virtual meetings hosted by a communication or messaging platform.

BACKGROUND

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices and allow for switching between different devices in the middle of a conversation. It has also become common for such applications to allow for documents and media (such as images, video, or audio) to be uploaded to a server, where they can then be transmitted to other chat participants.

Digital communication tools and platforms provide applications for hosting video conference calls dedicated to a particular meeting room. Such video conference calls may be accessed by remote attendees via their communication platform user accounts. Multiple attendees may physically be present in the particular meeting room and view a video stream presented in the particular meeting room. The same video stream may be concurrently sent to the respective computing devices of the user accounts that remotely access the video conference call.

Recent digital communication tools and platforms are driven by cloud-based peer-to-peer software which allow users to access teleconferences and online chat services from their mobile computer devices. Individuals with user accounts on the cloud-based software communication platform are able download a client application onto their mobile computer devices and can log onto the cloud-based platform via the client application using their user account credentials.

In many cases, the user may be provided with a digital event notification that includes a link for accessing a scheduled digital event, such as a virtual meeting. The digital event may be created by a host user account. Additional user accounts that have received the digital event notification are defined as guests who have been given permission by the host user account to attend (i.e. log onto and access) the digital event.

Host and guest user accounts are provided a variety of tools and functionalities while they are logged onto a virtual meeting. The host user account may have access to record the virtual meeting and provide guest user accounts with permission to record the virtual meeting. The host and guest user accounts may be able to concurrently send chat messages during the virtual meeting. Some chat messages may be sent to all the user accounts logged onto the virtual meeting. A user account may select specific user accounts logged onto the virtual meeting who are the intended recipients of certain chat messages.

Various collaborative tools and functionalities are also available to user accounts while logged into a virtual meeting. For example, guest user account can share a view of the current content displayed on the computer device they used to log into the virtual meeting. A digital whiteboard may be available for collaborative work between the user accounts. Various user accounts logged into the virtual meeting may concurrently modify and enter input to be displayed on the digital whiteboard such that all user accounts in the virtual meeting can view the digital whiteboard as it is updated and edited.

As the field of digital communication tools and platforms matures, new tools and functionalities continue to be developed. New use cases and end user scenarios emerge as a result of accelerated user adoption and different types of digital events reveal gaps in the tools and functionalities currently available.

SUMMARY

Conventional systems are deficient with respect to providing attendees physically present in a meeting room with the flexibility to choose to start and/or control a current video conference call directly from their computer device (e.g. personal mobile device).

Various embodiments of an apparatus, method(s), system(s) and computer program product(s) described herein are directed to pairing a computer device, via a client application running on the computer device, with a meeting room application of a communication platform. The meeting room application is associated with an identified physical meeting space that has a designated meeting controller device. The meeting controller device has one or more virtual meeting controls that generate control input for a respective virtual meeting presented by the meeting room application. The client application running on the paired computer device receives a selection to launch a meeting controller application ("controller application") at the paired computer device. The launched controller application running at the paired computer device send control input for an instance of a virtual meeting ("virtual meeting") presented by the meeting room application for the identified physical meeting space.

In some embodiments, the meeting controller device may be located in and designated for a particular meeting room. In some embodiments, the meeting controller device provides control functionalities for any virtual meeting instance presented at the particular meeting room and hosted by the video communication platform. It is understood that a virtual meeting instance may be accessed by one or more user accounts of attendees physically present in the particular meeting room and one or more user account of attendees remotely joining the virtual meeting.

According to various embodiments, the client application decodes a proximity pairing code generated by the meeting room application and emitted from a device(s) located in a designated meeting space. Based on the decoded proximity pairing code, the meeting room application creates a pairing association between the client application and an identifier for the designated meeting space. Since the computer device is paired to the designated meeting space via the pairing association in the meeting room application, the client application running on the paired computer device can start a virtual meeting to be presented on various devices physically located in the designated meeting space.

When a user of the paired computer device selects an option to start a virtual meeting presented in the client application running on the paired computer device, the meeting room application generates a user account instance associated with the client application. The user account instance represents attendance of the virtual meeting by the user of the paired computer device.

The user of the paired computer device can further select a launch functionality provided within the client application. Selection of the launch functionality launches a controller application on the paired computer device. The meeting room application generates a meeting controller instance that represents the launched controller application on the paired computer device. The controller application includes one or more types of virtual meeting controls. The user of the paired computing device can select any one of the virtual meeting controls provided by launched controller application. Selected virtual meeting controls generate control input for the virtual meeting without having to interact with a meeting controller device physically located in the designated meeting space. The meeting room application sends the control input from the meeting controller instance that represents the launched controller application to the virtual meeting.

According to various embodiments, the client application is associated with a communication platform at which the virtual meeting is instantiated and hosted and accessed via the meeting room application. In some embodiments, the client application allows a user account of the communication platform to access the virtual meeting and to transmit and receive one or more types of data and/or content related to the virtual meeting.

According to various embodiments, the controller application runs on the paired computer device bypasses the meeting controller device while sending control input directly to a virtual meeting.

Various embodiments described herein thereby provide an attendee in the particular meeting room with a flexibility to choose between directly operating the meeting controller device or controlling the virtual meeting from the attendee's paired computer device. For some attendees physically present in the particular meeting room, sending control input directly from their paired computer device may be preferred over directly interacting with and touching the meeting controller device so as to avoid any concerns related to hygiene and the inadvertent transmission of germs.

According to some embodiments, the controller application runs at the paired computer device concurrently with and independently from the client application. In some embodiments, the client application includes a functionality for launching the controller application.

According to some embodiments, the client application pairs the computer device with the meeting room application associated with the particular meeting room.

In some embodiments, the meeting room application receives control input from the controller application launched at the paired computer device while the client application is set to a companion mode. According to some embodiments, the companion mode suspends virtual meeting audio and video for the user account but maintains a virtual meeting chat messaging functionality for the user account.

In some embodiments, the controller application may be a web-based application access to which is embedded in a version of the client application for desktop computer devices.

In some embodiments, the client application may allow for a paired computer device to join an in-progress virtual meeting.

In some embodiments, the meeting room application may emit a scheduling code that the client application decodes in order to reserve the designated meeting space for an upcoming virtual meeting.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
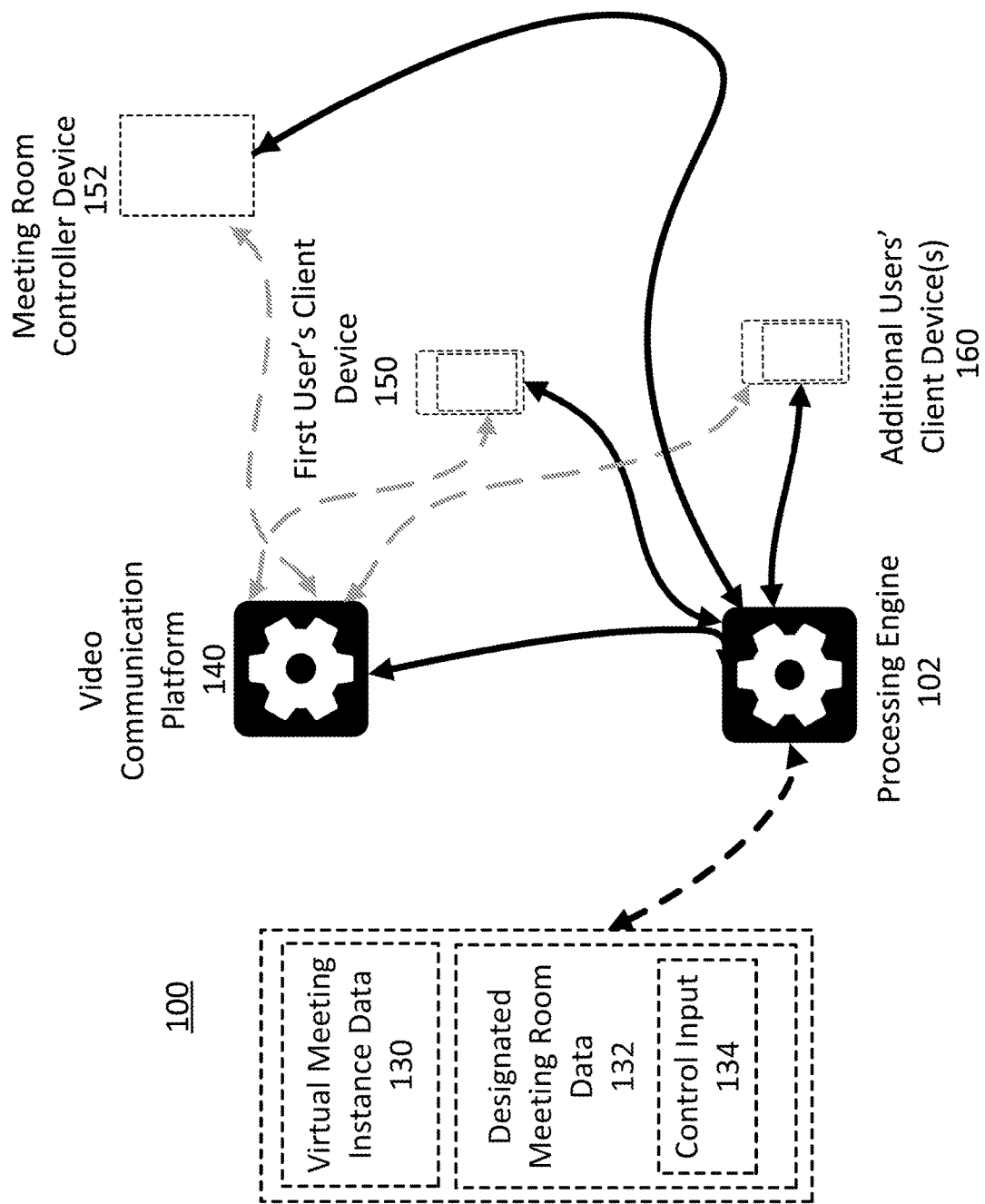
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a sending client device 150, one or more receiving client device(s) 160 and a meeting room controller device 152 are connected to a processing engine 102 and, optionally, a communication platform 140. The processing engine 102 is connected to the communication platform 140, and optionally connected to one or more repositories and/or databases for managing designated meeting room data 132, such as control input 134, and data 130 associated with a virtual meeting instance One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment, the processing engine 102 may perform the method 400 (FIG. 4) or other method herein and, as a result, receives control input from a client device 150 for a virtual meeting without requiring the control input being transmitted by the meeting room controller device 152. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Sending client device 150, the meeting room controller device 152 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150, the meeting room controller device 152 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the meeting room controller device 152 and/or the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication.

Figure 1B:
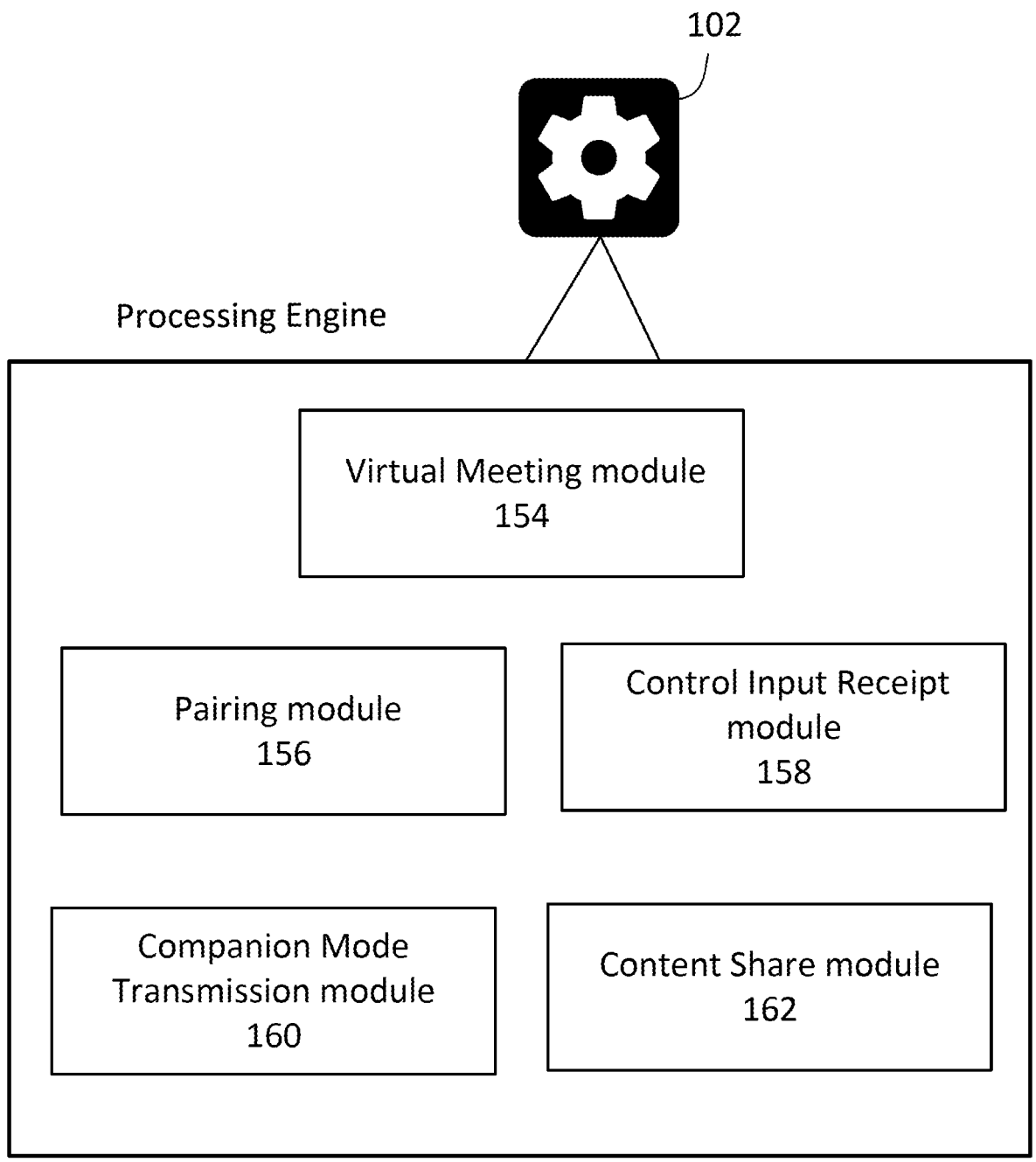
FIG. 1B is a diagram illustrating an exemplary environment in which some embodiments may operate.

FIG. 1B is a diagram illustrating exemplary software modules 154, 156, 158, 160, 162 that may execute some of the functionality described herein. According to some embodiments, one or more of exemplary software modules 154, 156, 158, 160, 162 may be part of the processing engine 102. In some embodiments, one or more of the exemplary software modules 154, 156, 158, 160, 162 may be distributed throughout the communication platform 140.

Virtual Meeting module 154 functions to instantiate and support hosting of an instance of a virtual meeting ("virtual meeting") on the communication platform 140. For example, at least a portion of the virtual meeting module may be included in a meeting room application.

Pairing module 156 functions to pair a computer device with a virtual meeting and/or meeting room application.

Control Input Receipt module 158 functions to receive control input for a virtual meeting.

Companion Mode Transmission module 160 functions to manage transmission of audio data, video data and chat data of a virtual meeting with respect to a current status of a companion mode at a paired computer device.

Content Share module 162 functions to share content in a virtual meeting received from a controller application launched in a paired computer device.

The above modules 154, 156, 158, 160, 162 and their functions will be described in further detail in relation to an exemplary method below. In addition, various embodiments described herein include one or more software modules for a controller application, a client application and/or a meeting room application that correspond to supporting, interacting and/or communicating with one or more of the exemplary software modules 154, 156, 158, 160, 162. For example, the one or more software modules for the controller application and/or the client application may perform client-side operations that are compatible with (or compliment) operations performed by the one or more exemplary software modules 154, 156, 158, 160, 162.

Figure 2A:
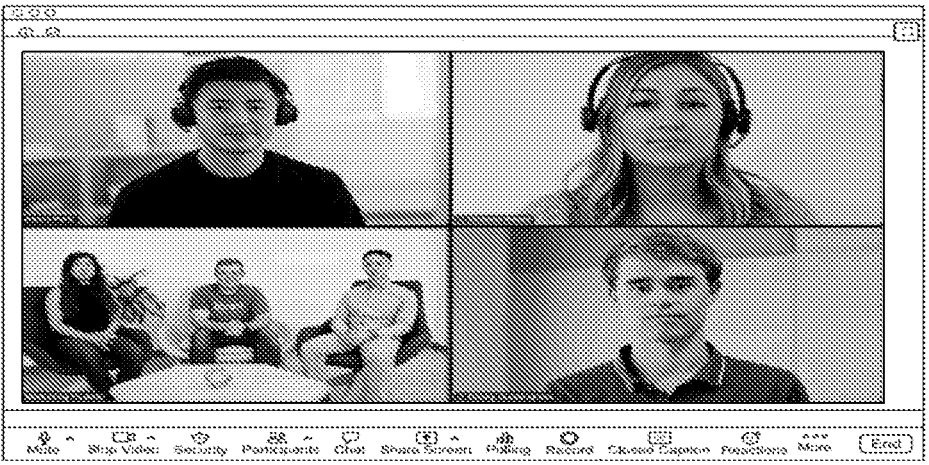
FIG. 2A is a diagram illustrating an exemplary environment in which some embodiments may operate.

As shown in FIG. 2A, a controller application 202 and a client application 204 associated with the communication platform 140 may be downloaded and installed on a computer device 150. The client application 204 includes functionality for a user account communications interface 206. The interface 206 provides access to video data, audio data and chat data related to a virtual meeting joined by a user account associated with the client application 204 running on the computer device 150. The interface 206 further provides various types of tools, functionalities, and settings that can be selected by a user during a virtual meeting.

The controller application 202 runs on the computer device 150 separately, concurrently and independently from the client application 204. The controller application 202 provides access to virtual meeting control tools and settings that are available on a meeting room control device 152. Various types of virtual meeting control tools and settings are, for example, mute/unmute audio, turn on/off meeting room camera, start meeting, join meeting, initiate phone call(s), view and call contacts, change audio and video settings (including microphone and camera).

Figure 2B:
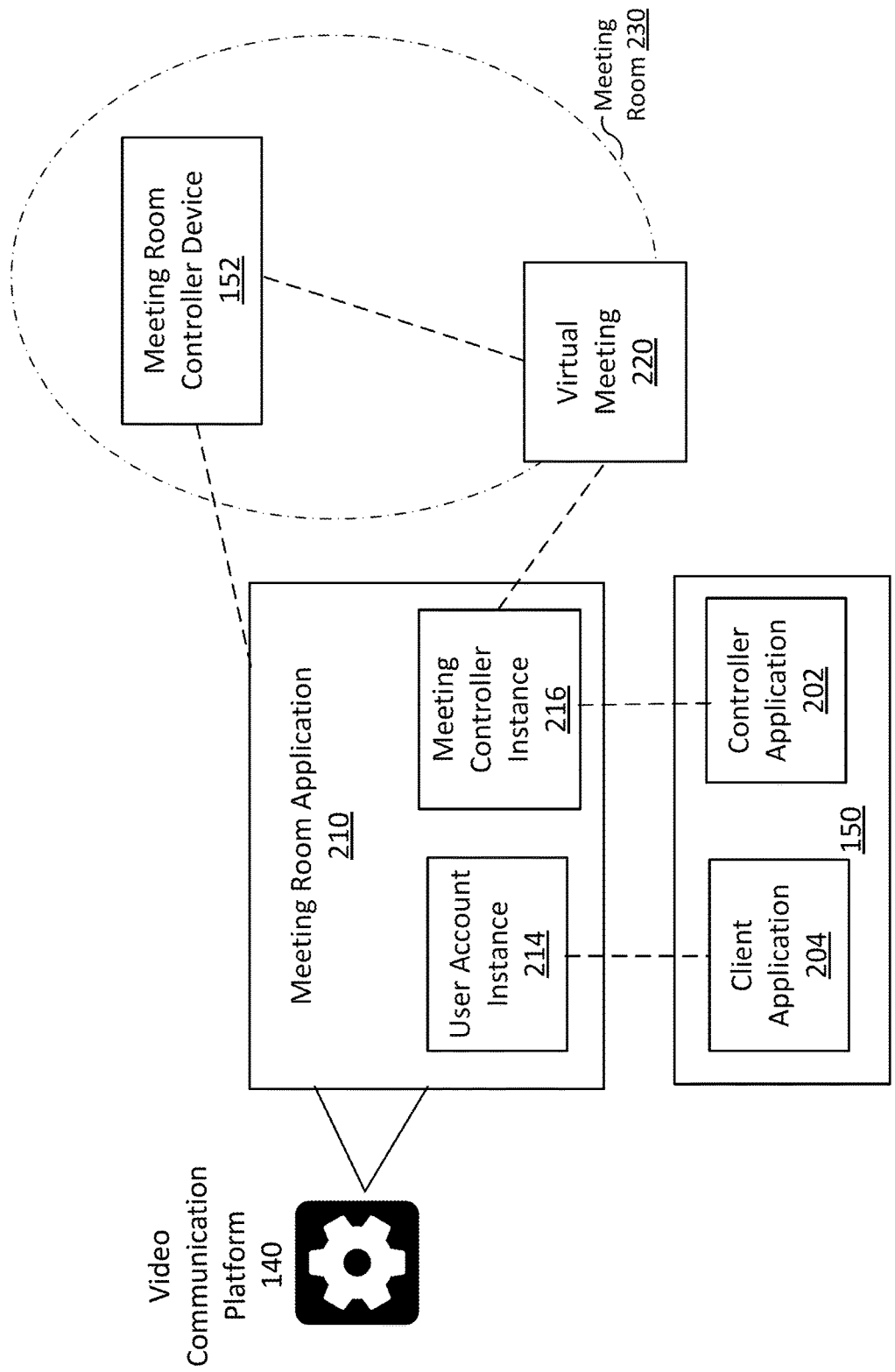
FIG. 2B is a diagram illustrating an exemplary environment in which some embodiments may operate.

As shown in FIG. 2B, the communication platform 140 provides access to a meeting room application 210 for hosting and presenting virtual meetings 220. For example, the meeting room application may host, via the communication platform 140, a virtual meeting 220 associated with a designated physical meeting room 230. An input device, such as a meeting room controller device 218, may be located in the meeting room 230. The meeting room controller 218 provides various meeting controls for sending control input to any virtual meeting presented at the meeting room 230.

The paired computer device 150 has a client application 204 set in a companion mode and a launched controller application 202. The meeting room application 210 creates a user account instance 214 that corresponds to the client application 204 on the paired computer device 150. The user account instance 214 represents virtual meeting attendance of the user account that corresponds to the client application 204. The meeting room application 210 creates a meeting controller instance 216 that corresponds to the controller application 202 on the paired computer device 150. The controller instance 216 send control input that corresponds to virtual meeting controls selected at the controller application 202 on the paired computer device.

Figure 3A:
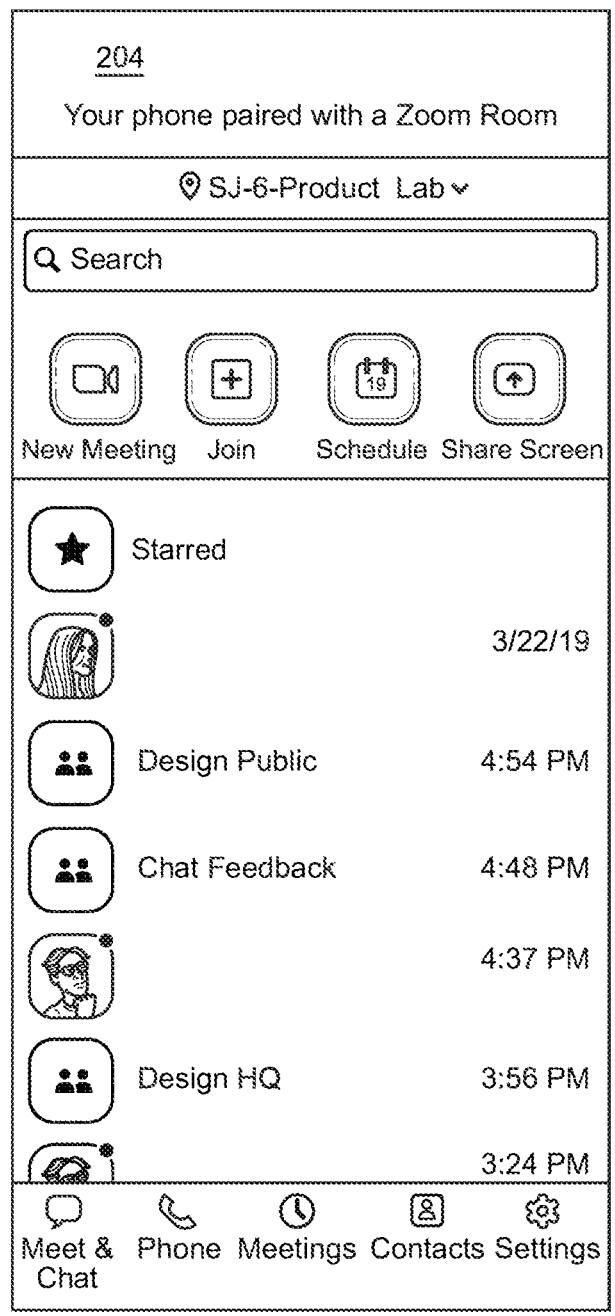
FIG. 3A is a diagram illustrating an exemplary environment in which some embodiments may operate.

As shown in FIG. 3A, a client application 204 pairs with a designated meeting space 230. According to various embodiments, a computer device 150 may be at least proximate to a designated meeting space 230 that includes a meeting room controller device 152 associated with a meeting room application 210 for hosting and presenting virtual meetings at the designated meeting space 230. For example, the meeting room application 210 instantiates and manages the presentation of virtual meetings hosted by the communication platform 140 and presented at the designated meeting space 230 and controlled by the meeting room controller device 152.

An attendee physically present at (or proximate to) the designated meeting space 230 may have a computer device 150 that runs an instance of the client application 204. The client application 204 may be set to a listening mode in order to detect a proximity pairing code emitted by the meeting room controller device 152 at the designated meeting space 230. For example, the proximity pairing code may be an ultrasonic tone or a sharing key.

Upon detection of the proximity pairing code, the client application 204 decodes the proximity pairing code. The decoded proximity pairing code provides an identifier for the designated meeting space 230. The client application 204 utilizes the decoded pairing code to pair with the designated meeting space 230 by connecting to one or more software modules of the meeting room application 210 of the communication platform 140 that instantiate, manage and present virtual meetings for the designated meeting space 230.

Figure 3B:
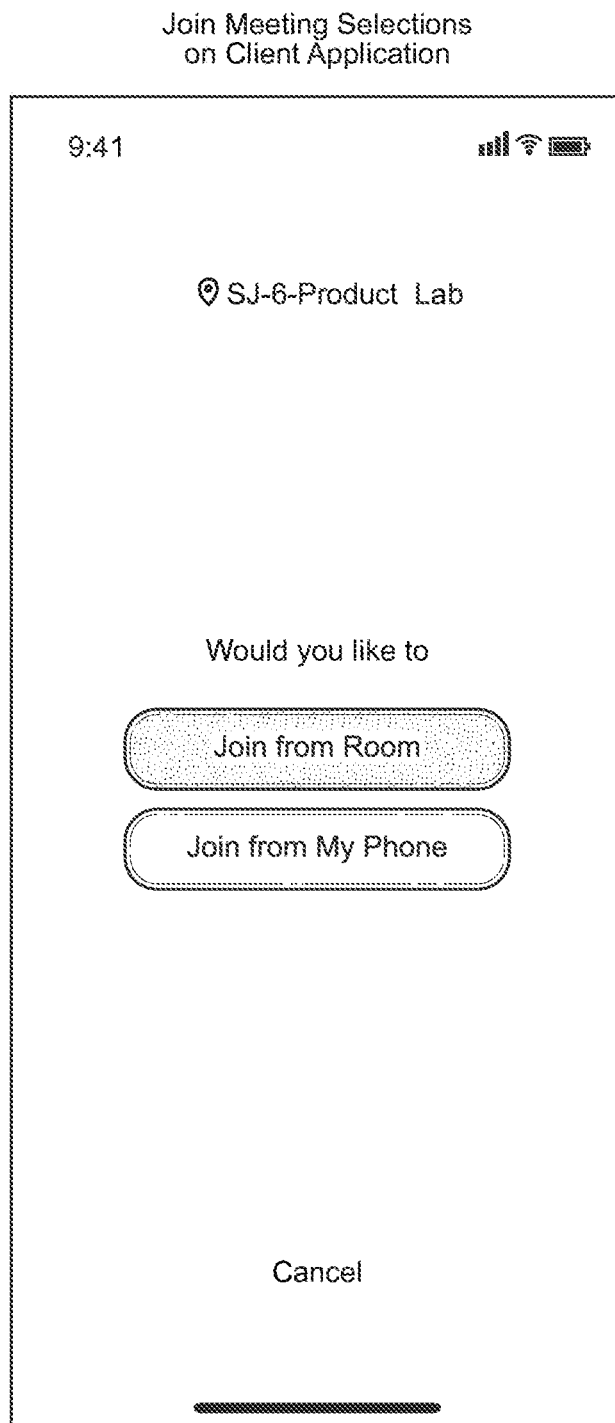
FIG. 3B is a diagram illustrating an exemplary environment in which some embodiments may operate.

As shown in FIG. 3B, the client application 204 provides an option to join a virtual meeting via the meeting room application 210 or via the paired computer device 150. The attendee selects the option to "Join from Room." The meeting room application 210 generates a user account instance 214 representing the client application 204, which will be set to a companion mode. The controller application 202 will be launched on the paired computer device 150 and the meeting room application 210 generates a meeting controller instance 216 that corresponds to the controller application 202.

Figure 3C:
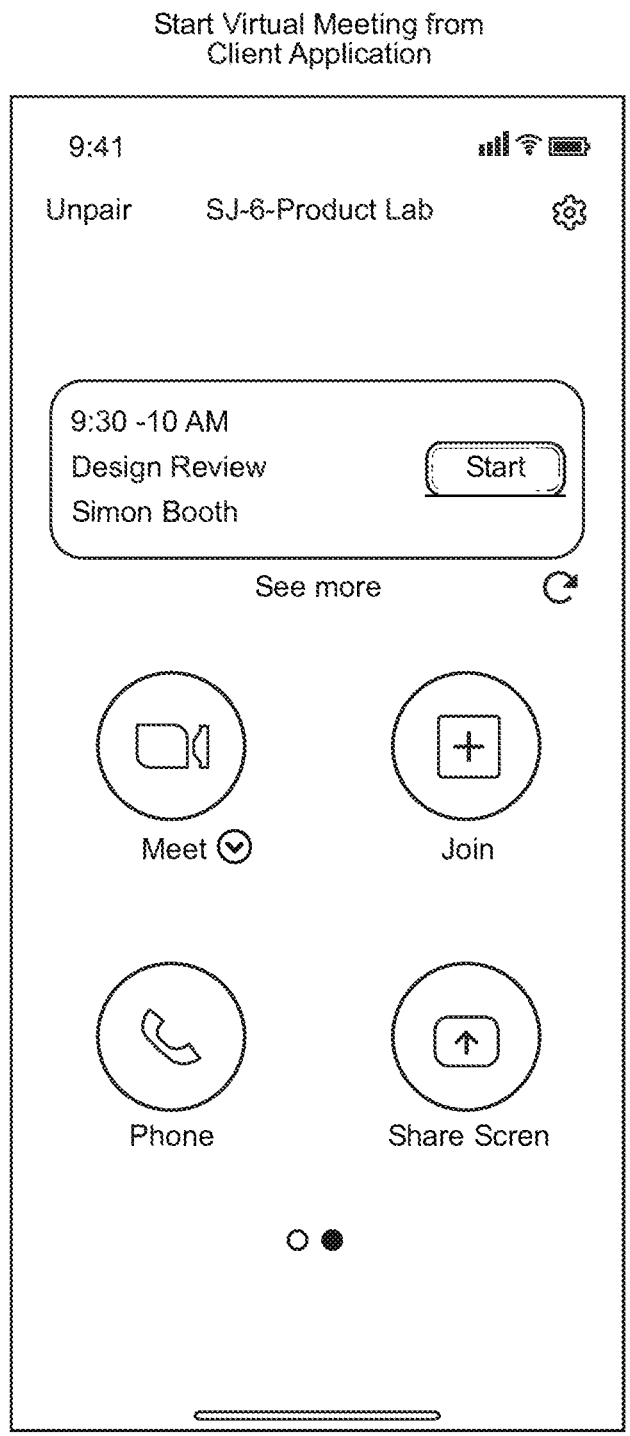
FIG. 3C is a diagram illustrating an exemplary environment in which some embodiments may operate.

As shown in FIG. 3C, a user of the paired computer device 150 can start a virtual meeting on the meeting room application 210 via a client application 204 on the paired computer device 150.

Figure 3D:
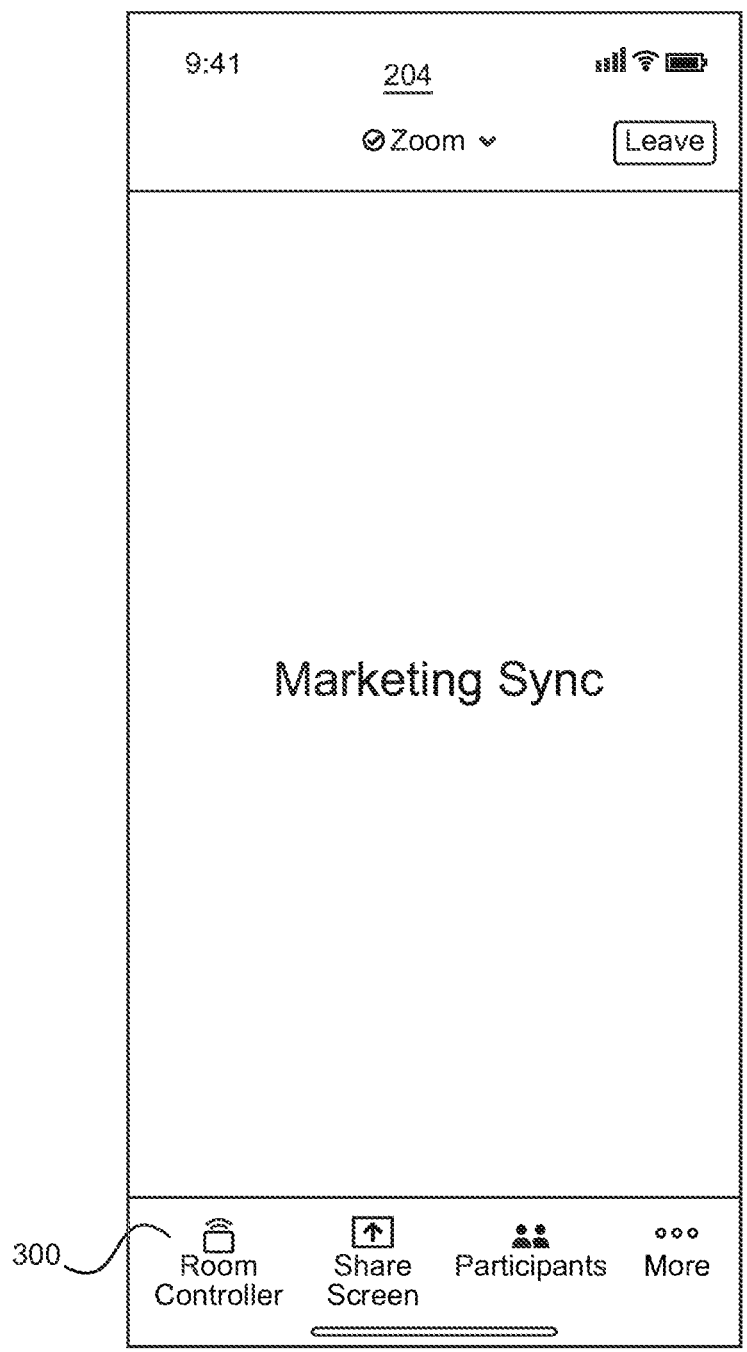
FIG. 3D is a diagram illustrating an exemplary environment in which some embodiments may operate.

As shown in FIG. 3D, the client application 204 is set into a companion mode in which audio data and video data from the virtual meeting is suspended for the paired computer device 150. The client application 204 further includes a launch functionality 300. Upon receiving selection of the launch functionality 300, the controller application 202 is launched on the paired computer device 150. The launched controller application 202 runs on the paired computer device 150 concurrently with the controller application 202 and companion mode. The launched controller application 202 further runs independently of the controller application 202.

While the client application 204 is in the companion mode, chat message data from the virtual meeting can be sent to and received by the paired computer device 150 via the client application 204. In addition, the client application 204 in companion mode provides functionality for sharing content with the virtual meeting. For example, content that is stored external to the virtual meeting may be accessed by the client application 204 and shared with the virtual meeting. The accessed content is passed to the controller application 202 and the controller application 202 sends content directly to the meeting room application 210.

Figure 3E:
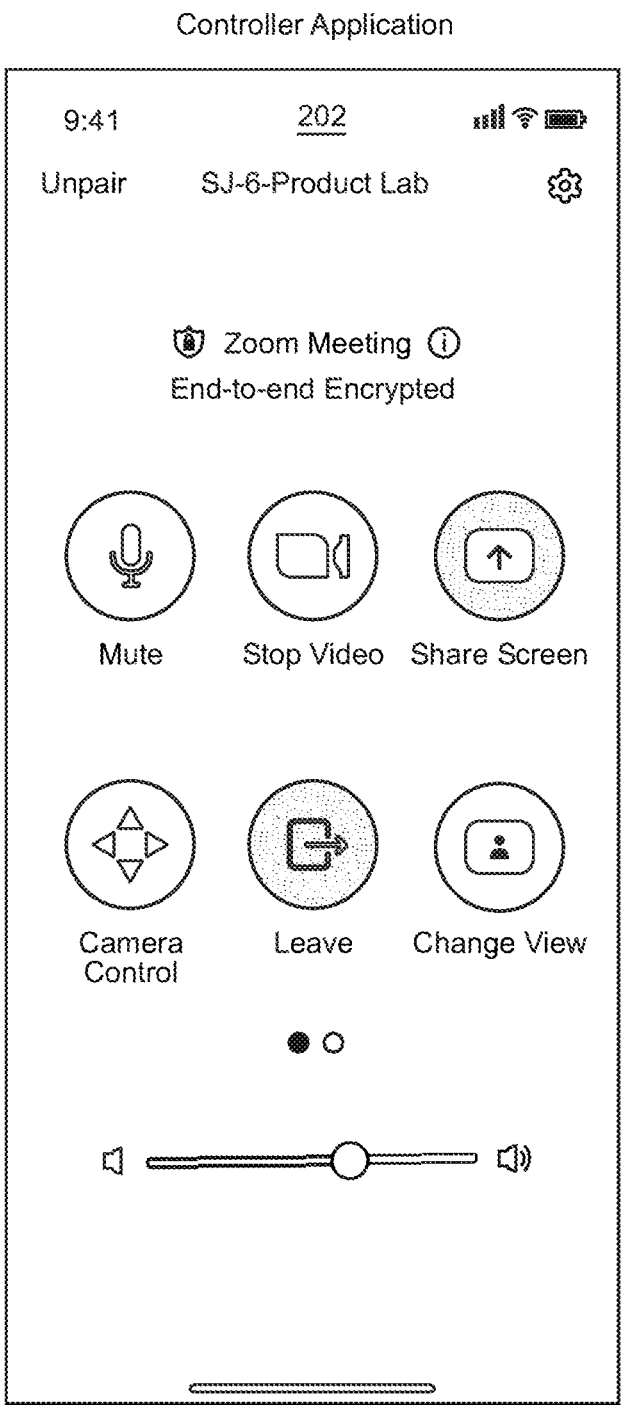
FIG. 3E is a diagram illustrating an exemplary environment in which some embodiments may operate.

As shown in FIG. 3E, the launched controller application 202 runs on the paired computer device 150 and provides virtual meeting controls that are also available on the meeting room controller device 152. Control input based on respective virtual meeting controls selected on the controller application 202 will bypass the meeting room controller device 152 and the meeting room application 210 sends control input from the meeting controller instance 216 for the paired computer controller application 202 directly to the virtual meeting.

In various embodiments, one or more of the virtual meeting controls may adjust and/or mute audio data of the virtual meeting and video data of the virtual meeting. A virtual meeting control may allow a user of the paired computer device 152 to adjust an orientation of a video camera present in the designated meeting space 230. Another virtual meeting control may further allow the user of the paired computer device 152 to change a virtual meeting view. For example, a current virtual meeting view may be based on a video feed from a video camera present in the designated meeting space 230 such that a video portraying all the attendees present in the designated meeting space 230 is streamed to the virtual meeting. The user of the paired computer device 152 may select to change the meeting view by changing a physical orientation of the video camera towards a whiteboard present in the designated meeting space 230. The video feed portraying all the attendees present in the designated meeting space 230 streamed to the virtual meeting will thereby be replaced with a video feed portraying the whiteboard.

According to various embodiments, a proximity code may be a scheduling code emitted by from a device(s) in a designated meeting room. A user of a computer device 150 may be proximate to the designated meeting room and the client application 204 running on the computer device 150 may detect the emitted scheduling code and decode the scheduling code. The meeting room application 210 receives the decoded scheduling code from the client application 204 and creates an association between the computer device 150 and an identifier for that designated meeting room in the meeting room application 210.

In response to receipt of the decoded scheduling code from the computer device 150, the meeting room application 210 may send one or more available meeting timeslots that indicate various days and times the designated meeting room is available for booking. Selection of an available meeting time slot in order to book the designated meeting room for an upcoming virtual meeting may be performed directly through the client application 204. The meeting room application 210 reserves the designated meeting room for the user account associated with the computer device 150 at the selected meeting time slot.

The meeting room application 210 further generates a unique pairing code specific to the computer device 150 and sends the unique pairing code to the client application 204. The unique pairing code can be later accessible by the client application 204 at the scheduled time for the upcoming virtual meeting. By generating a unique pairing code specific to the computer device 150 and the upcoming virtual meeting, only the client application 204 on the computer device 150 will be able to decode the unique pairing code at the scheduled time in order to start the virtual meeting.

Figure 4:
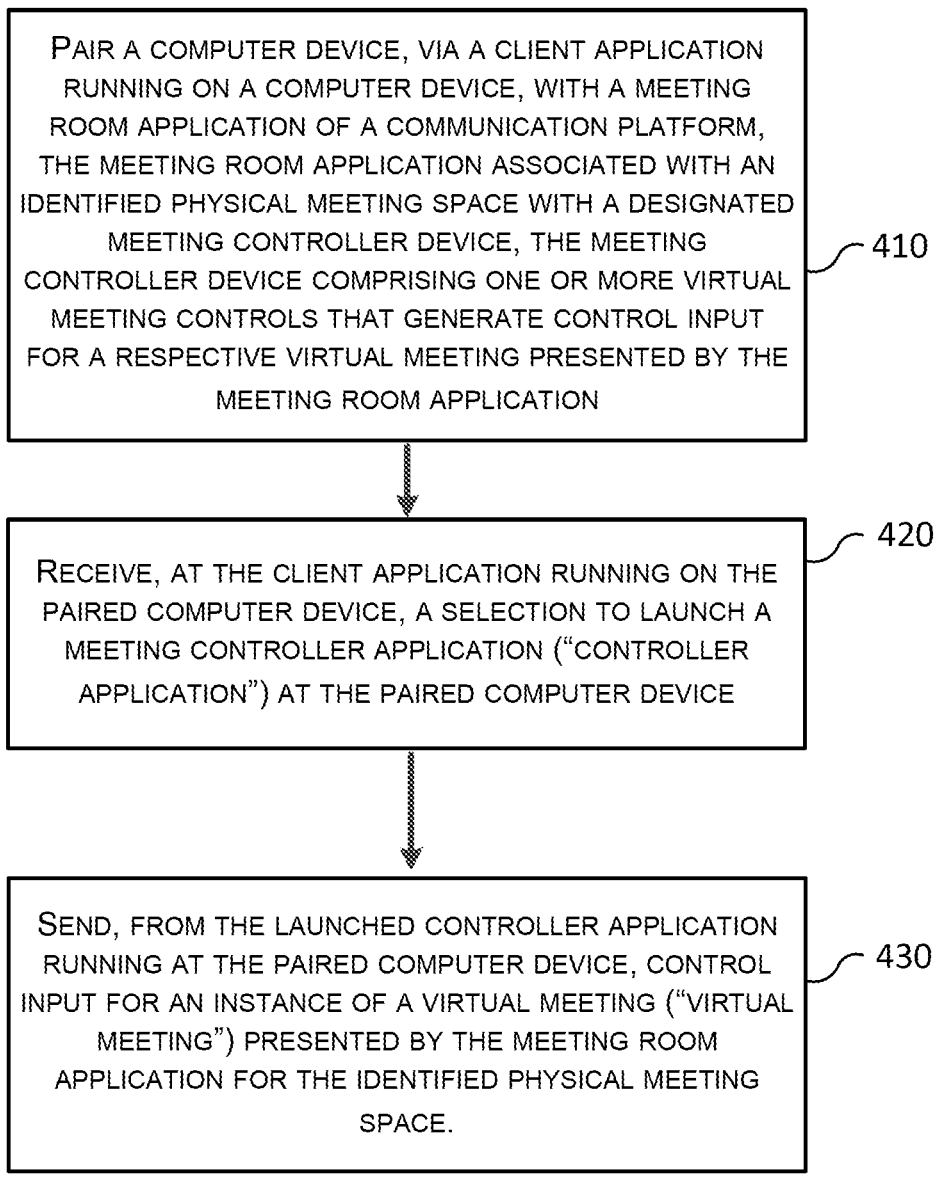
FIG. 4 is a diagram illustrating an exemplary method that may be performed in some embodiments.

As shown in flowchart 400 of FIG. 4, a computer device pairs, via a client application 204 running on the computer device, with a meeting room application 210 of a communication platform. In various embodiments, the meeting room application 210 is associated with an identified physical meeting space 230 with a designated meeting controller device 152. The meeting controller device 152 comprises one or more virtual meeting controls that generate control input for a respective virtual meeting presented by the meeting room application 210. (Act 410)

According to various embodiments, when a user of the paired computer device chooses an option in the client application 204 to start a virtual meeting via the meeting room application 210, the meeting room application 210 creates a user account instance 214 tied to the client application 204 in order to represent the user of the paired computer device's attendance in the virtual meeting. In some embodiments, the meeting room application 210 may create and present an anonymous identifier for each user account that has joined the virtual meeting. The client application 204 is set to the companion mode while the meeting room application 210 maintains the user account instance 214 for the virtual meeting. In various embodiments, since the virtual meeting has a user account instance 214 tied to the client application 204 of the paired computer device, the virtual meeting application can still send chat messages, polls and/or surveys to the client application 204 in companion mode.

In some embodiments, the meeting controller device 152 may be a personal controller device 152 tied to user credentials of the same user that is associated with the paired computer device. For example, a personal controller device 152 may be located in the user's home. However, the user may be temporarily at a distance from being able to interact with the personal controller device 152 but close enough for the computer device to decode a proximity code emitted by the personal controller device 152 in order to pair the computer device with the personal controller.

Since the personal controller device 152 is tied to the user's personal credentials, a virtual meeting started on the meeting room application 210 from the paired computer device (that decoded the personal controller device 152's proximity code) would include display of a user account identifier that clearly identifies the user account associated with the paired computer device—as opposed to an anonymous identifier.

The client application 204 running on the paired computer device receives a selection to launch a meeting controller application 202 ("controller application") at the paired computer device. (Act 420). In some embodiments, the launched controller application 202 may have access to stored meeting room application 210 preferences that corresponds to the user account associated with the paired computer device. For example, the launched controller application 202 may automatically access the meeting room application 210 preferences and send the preferences as control input to a current virtual meeting. Such stored meeting room application 210 preferences may be, for example, meeting room speaker settings, meeting room video camera settings and/or Bluetooth settings.

In some embodiments, the client application 204, while in companion mode, may access content external to a virtual meeting that is currently in progress. The client application 204 passes the accessed external content to the launched controller application 202 on the paired computer device. The controller application 202 receives the external content passed by the client application 204 and sends the content to the virtual meeting so that the content can be shared to one or more of the user accounts that have joined the virtual meeting.

The launched controller application 202 running at the paired computer device sends control input for an instance of a virtual meeting ("virtual meeting") presented by the meeting room application 210 for the identified physical meeting space 230. (Act 430)

According to various embodiments, the client application 204 may be connected to a web application framework that provides a marketplace for various types of applications developed by third-party developers. For example, a version of the controller application 202 meant to be run on desktop personal computers may be available in the web application framework marketplace. The desktop version of the controller application 202 may be a web application. The user of a paired desktop personal computer accesses the web-based controller application 202 through a version of the client application 204 running on the desktop personal computer. The desktop client application 204 accesses the web-based controller application 202 in the marketplace and the controller application 202 is cross launched on the web and embedded in the client application 204 running on the desktop personal computer.

Figure 5:
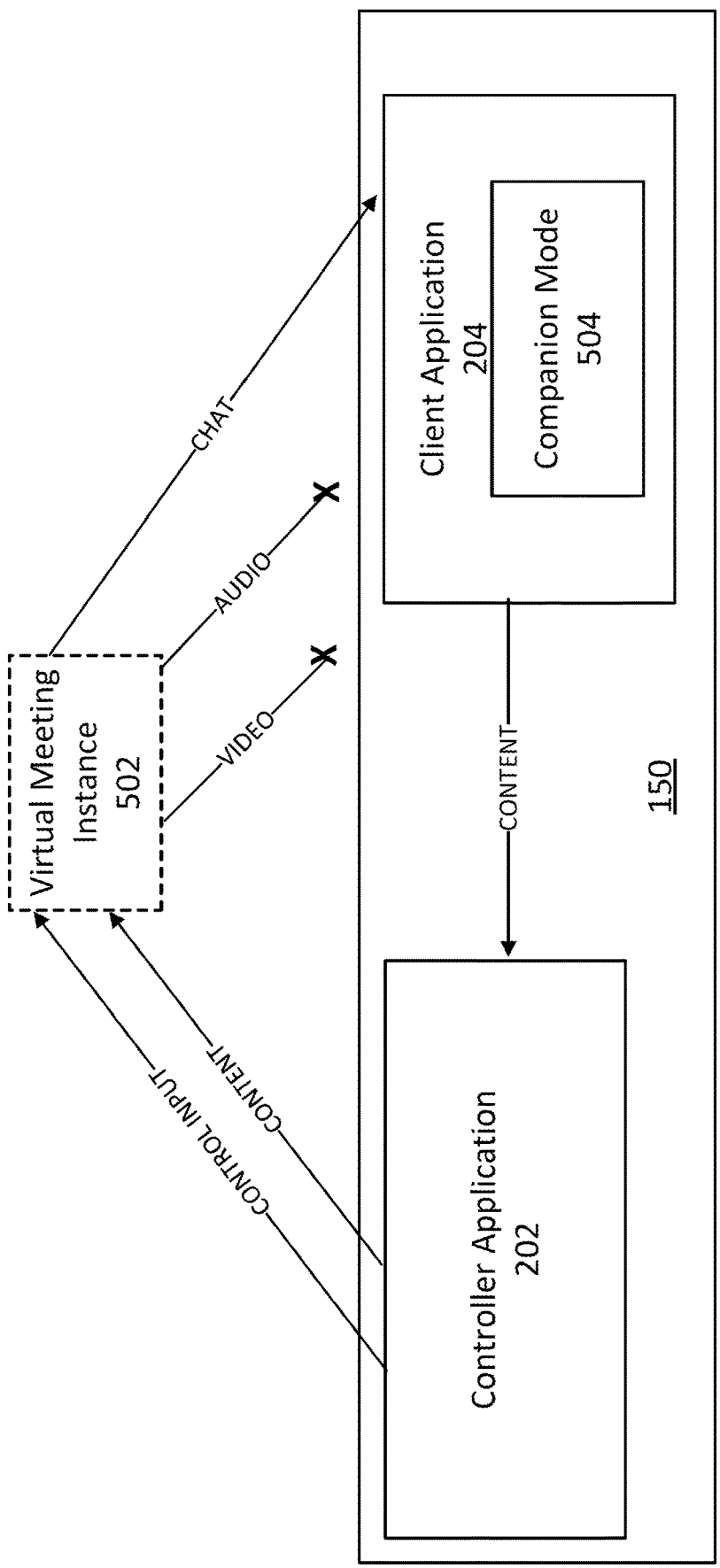
FIG. 5 is a diagram illustrating an exemplary environment in which some embodiments may operate.

As shown in FIG. 5, a virtual meeting instance 502 ("virtual meeting") may be presented by a meeting room application 210. In some embodiments, the virtual meeting 502 is started by a computer device 150 that has been paired with the meeting room application 210. The client application 204 is set to a companion mode 504 while the controller application 202 runs on the paired computer device 150 and sends control input to the virtual meeting 502. According to various embodiments, the companion mode 504 disables virtual meeting video and virtual meeting audio for the client application 204. However, chat messaging is still available on the client application 204 in companion mode 504 and while the launched controller application 202 is sending (can send) control input.

Figure 6:
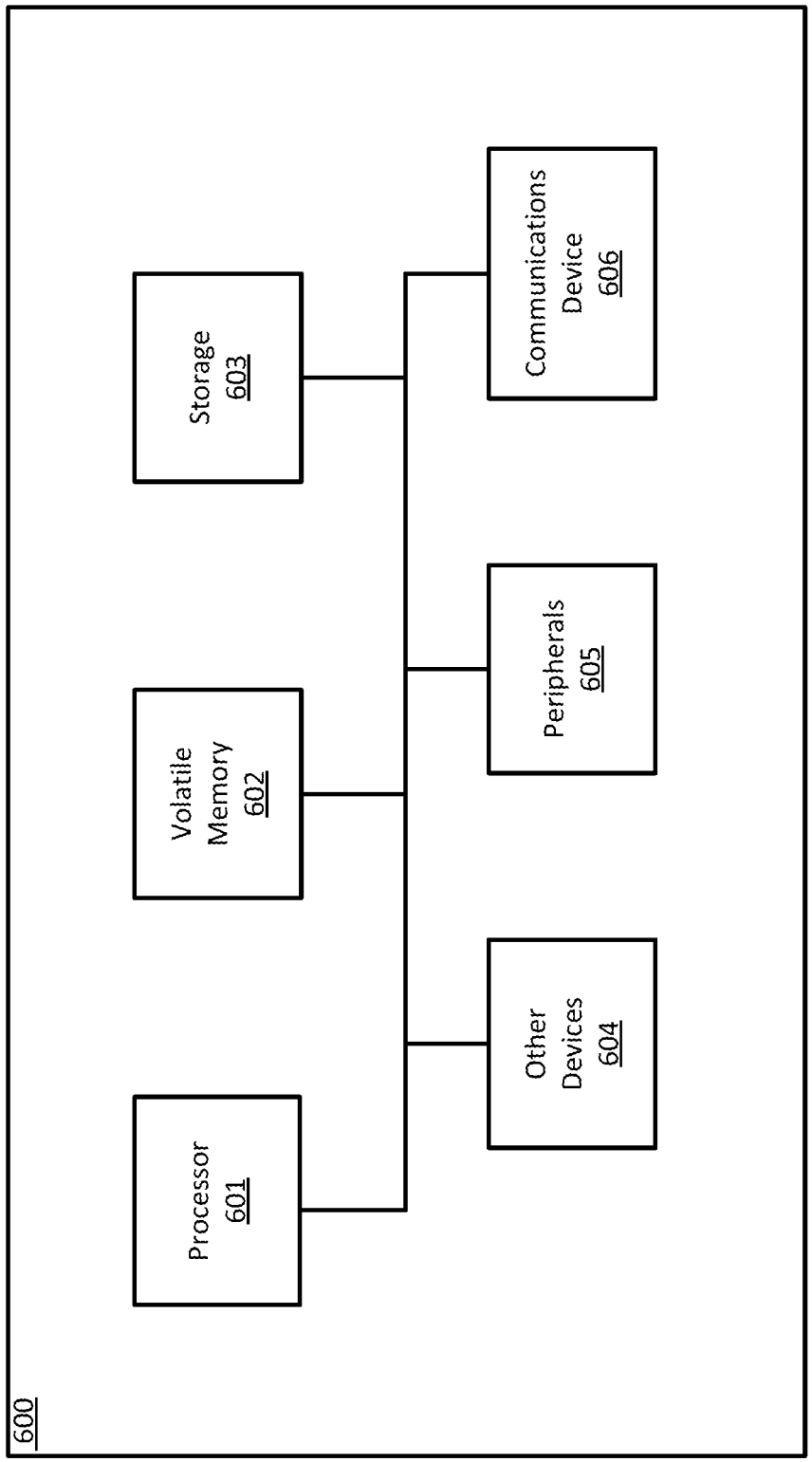
FIG. 6 is a diagram illustrating an exemplary environment in which some embodiments may operate.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor7.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 600 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   pairing a computing device with a meeting controller device that is associated with a meeting room application of a communication platform, the meeting controller device including one or more virtual meeting controls configured to generate a control input for a virtual meeting, wherein the computing device and the meeting controller device share a user account;
   receiving a selection to launch a meeting controller application at the paired computing device;
   accessing, by the meeting controller application, meeting room application preferences that correspond to the user account;
   sending, by the meeting controller application, the control input including the meeting room application preferences to a meeting controller instance of the meeting room application, the control input corresponding to the virtual meeting presented by the meeting room application;
   starting the virtual meeting in the meeting room application via a client application running on the paired computing device;
   presenting an identifier of the user account associated with the paired computing device in the virtual meeting; and
   presenting an anonymous identifier in the virtual meeting for each respective additional user account joined into the virtual meeting.

2. The method of claim 1, wherein the meeting controller application runs at the paired computing device concurrently with a client application, wherein the meeting controller application includes the one or more virtual meeting controls, and wherein the meeting controller application operates independently from the client application.

3. The method of claim 1, wherein receiving the selection to launch the meeting controller application at the paired computing device comprises:
   initiating a companion mode that suspends audio data and video data of the virtual meeting at the meeting room application and maintains chat message data of the virtual meeting at the paired computing device.

4. The method of claim 1, wherein the control input is sent while the paired computing device is in a companion mode.

5. The method of claim 1, further comprising:
   accessing content external to the virtual meeting;
   passing the accessed external content to the meeting controller application while the paired computing device is in a companion mode; and
   sharing the passed content with the virtual meeting.

6. The method of claim 5, wherein sharing the passed content with the virtual meeting comprises:
   providing an additional user account with access to the passed content in the virtual meeting, wherein the additional user account is associated with a remote access of the virtual meeting.

7. The method of claim 1, wherein pairing the computing device comprises:
   decoding a proximity code emitted by the meeting controller device, the decoded proximity code comprising an identifier for a designated meeting room; and
   associating the paired computing device and the designated meeting room in the meeting room application based on the decoded proximity code.

8. The method of claim 7, wherein the proximity code comprises a scheduling code, the method further comprising:
   associating the paired computing device and one or more available meeting time slots in a meeting room calendar for the designated meeting room in the meeting room application based on the scheduling code.

9. The method of claim 1, further comprising:
   receiving, from the client application, a selection to initiate a companion mode that suspends audio and video data of the virtual meeting for the user account associated with the paired computing device, while maintaining chat message functionality.

10. A non-transitory computer readable medium storing instructions operable to cause one or more processors to perform operations comprising:
    pairing a computing device with a meeting controller device that is associated with a meeting room application of a communication platform, the meeting controller device including one or more virtual meeting controls configured to generate a control input for a virtual meeting, wherein the computing device and the meeting controller device share a user account;
    receiving a selection to launch a meeting controller application at the paired computing device;
    accessing, by the meeting controller application, meeting room application preferences that correspond to the user account;
    sending, by the meeting controller application, the control input including the meeting room application preferences to a meeting controller instance of the meeting room application, the control input corresponding to the virtual meeting presented by the meeting room application;
    starting the virtual meeting in the meeting room application via a client application running on the paired computing device;
    presenting an identifier of the user account associated with the paired computing device in the virtual meeting; and
    presenting an anonymous identifier in the virtual meeting for each respective additional user account joined into the virtual meeting.

11. The non-transitory computer readable medium of claim 10, wherein the meeting controller application runs at the paired computing device concurrently with a client application, wherein the meeting controller application includes the one or more virtual meeting controls, and wherein the meeting controller application operates independently from the client application.

12. The non-transitory computer readable medium of claim 10, wherein receiving the selection to launch the meeting controller application at the paired computing device comprises:
    initiating a companion mode that suspends audio data and video data of the virtual meeting at the meeting room application and maintains chat message data of the virtual meeting at the paired computing device.

13. The non-transitory computer readable medium of claim 10, wherein the control input is sent while the paired computing device is in a companion mode.

14. The non-transitory computer readable medium of claim 10, wherein the instructions are further operable to cause the one or more processors to perform operations comprising:
  accessing content external to the virtual meeting;
  passing the accessed external content to the meeting controller application while the paired computing device is in a companion mode; and
  sharing the passed content with the virtual meeting.

15. The non-transitory computer readable medium of claim 14, wherein sharing the passed content with the virtual meeting comprises:
  providing an additional user account with access to the passed content in the virtual meeting, wherein the additional user account is associated with a remote access of the virtual meeting.

16. An apparatus, comprising:
  a memory; and
  a processor configured to execute instructions stored in the memory to:
  pair a computing device with a meeting controller device that is associated with a meeting room application of a communication platform, the meeting controller device including one or more virtual meeting controls configured to generate a control input for a virtual meeting, wherein the computing device and the meeting controller device share a user account;
  receive a selection to launch a meeting controller application at the paired computing device;
  access, by the meeting controller application, meeting room application preferences that correspond to the user account;
  send, by the meeting controller application, the control input that includes the meeting room application preferences to a meeting controller instance of the meeting room application, the control input corresponding to the virtual meeting presented by the meeting room application;
  start the virtual meeting in the meeting room application via a client application running on the paired computing device;
  present an identifier of the user account associated with the paired computing device in the virtual meeting; and
  present an anonymous identifier in the virtual meeting for each respective additional user account joined into the virtual meeting.

17. The apparatus of claim 16, wherein the instructions stored in the memory to pair the computing device comprise instructions stored in the memory to:
  decode a proximity code emitted by the meeting controller device, the decoded proximity code comprising an identifier for a designated meeting room; and
  create an association between the paired computing device and the designated meeting room in the meeting room application based on the decoded proximity code.

18. The apparatus of claim 17, wherein the proximity code comprises a scheduling code, and wherein the processor is further configured to execute instructions stored in the memory to:
  create an association between the paired computing device and one or more available meeting time slots in a meeting room calendar for the designated meeting room in the meeting room application based on the scheduling code.

19. The apparatus of claim 16, wherein the processor is further configured to execute instructions stored in the memory to:
  receive content external to the virtual meeting from the paired computing device and share the received content with the virtual meeting via access to at least one additional user account associated with a remote participant.

20. The apparatus of claim 16, wherein the meeting controller application runs at the paired computing device concurrently with a client application, wherein the meeting controller application includes the one or more virtual meeting controls, and wherein the meeting controller application operates independently from the client application.

* * * * *